United States Patent [19]

Furuya

[11] Patent Number: 4,880,590

[45] Date of Patent: Nov. 14, 1989

[54] PROCESS FOR PRODUCING ROLLERS EQUIPPED WITH A RUBBER LAYER

[75] Inventor: Akira Furuya, Yokohama, Japan

[73] Assignee: Canon Kabushiki Kaisha, Tokyo, Japan

[21] Appl. No.: 55,059

[22] Filed: May 28, 1987

[30] Foreign Application Priority Data

Jun. 4, 1986 [JP] Japan ................................ 61-128003

[51] Int. Cl.4 ................................................ B29C 47/02

[52] U.S. Cl. ..................................... 264/275; 264/236; 264/DIG. 68; 425/113

[58] Field of Search ............... 264/275, DIG. 68, 236; 425/113, 126 R

[56] References Cited

U.S. PATENT DOCUMENTS

| | | | |
|---|---|---|---|
| 3,380,120 | 4/1968 | Rowland et al. | 425/113 |
| 3,606,635 | 9/1971 | Benteler et al. | 425/113 |
| 3,751,550 | 8/1973 | Nauta | 264/275 |
| 3,859,017 | 1/1975 | Meudec | 425/113 |
| 3,957,942 | 5/1976 | Meudec | 264/235 |
| 3,978,181 | 8/1976 | Vahle | 264/275 |
| 4,173,058 | 11/1979 | Stieger | 425/113 |

FOREIGN PATENT DOCUMENTS

| | | |
|---|---|---|
| 982108 | 6/1951 | France . |
| 2034195 | 12/1970 | France . |
| 705298 | 3/1954 | United Kingdom . |

OTHER PUBLICATIONS

Patent Abstracts of Japan, vol. 6, No. 249, Dec. 8, 1982.
Patent Abstracts of Japan, vol. 8, No. 120, Jun. 6, 1984.

*Primary Examiner*—James Lowe
*Attorney, Agent, or Firm*—Fitzpatrick, Cella, Harper & Scinto

[57] ABSTRACT

A platen roller producing process includes the steps of coating the circumferential wall of a core metal with a rubber material, inserting the core metal coated with the rubber material into a cylindrical mold and subjecting the mold to a heating treatment.

7 Claims, 1 Drawing Sheet

PROCESS FOR PRODUCING ROLLERS EQUIPPED WITH A RUBBER LAYER

BACKGROUND OF THE INVENTION

1. Field of the Invention

This invention relates to a process for producing a roller equipped with a rubber layer to be used as a constituting part of a conveying means of various articles or for a platen roller which is a printing means for typewriters, etc.

2. Related Background Art

A roller equipped with a rubber layer having a rubber layer provided around the circumferential wall of a core metal having primarily a columnar outer shape has been utilized as, for example, a constituting part of a conveying means of various articles or as a platen roller of the printing means for typewriters, etc.

Such a roller equipped with a rubber layer has been produced primarily according to a process using a cross-head extrusion molding machine.

A cross-head extrusion molding machine typically has a structure as shown in FIGS. 2A and 2B, and when rubber material 2 and core metal 3 are fed through separate feeding inlets, the rubber material 2 is extruded around the core metal 3 delivered in the cross-head 4, and further under the state coated around the circumferential wall of the core metal 3 delivered together with the core metal 3 from the outlet of the cross-head.

the core metal coated with the rubber material thus obtained is subsequently subjected to, for example, the steps as shown below to become a roller equipped with a rubber layer as the final product.

(a) The rubber material on the core metal is cut to a constant dimension.

(b) The rubber is vulcanized directly with vapor in a vulcanizing can.

(c) The end faces of the core metal are cut as protruded.

(d) The rubber layer surface coated on the core metal is finished by surface polishing.

According to the process for producing a roller equipped with a rubber layer according to the steps of the prior art as described above, the rubber material surface after cross-head extrusion molding is liable to become rough, and generation of unevenness is marked and yet it is similar even in the rubber layer obtained after vulcanization, and therefore polishing treatment of the rubber layer surface as the secondary working is essentially required.

Also, in the polishing treatment of the rubber layer surface, desired surface roughness for smoothness cannot be necessarily obtained on the rubber layer surface in some cases, and in many cases, the worked surface may become rougher although unevenness in outer diameter irregularity may be connected.

The present invention has been accomplished in view of such problems, and its object is to provide a process for producing a roller equipped with a rubber layer which can realize low cost by reducing the number of steps by omitting the polishing treatment of the rubber layer surface as the secondary working, and also can easily obtain desired smoothness or surface roughness on the rubber layer surface.

SUMMARY OF THE INVENTION

The above object can be accomplished by the present invention as described below.

In one aspect of the present invention, there is provided a process for producing a roller equipped with a rubber layer, comprising the steps of: coating the circumferential wall of a core metal with a rubber material, inserting the core metal coated with said rubber material into a cylindrical mold, and subjecting said mold under the state in which the core metal coating with said rubber material is inserted to a heating treatment.

That is, the process of the present invention is characterized by transferring the shape or the surface state of the inner surface of a cylindrical mold onto the rubber layer surface after the vulcanization treatment by inserting the core metal coated with rubber material into a cylindrical mold and subjecting it under such state to vulcanization treatment, and the rubber layer surface can be easily molded with the shape and the surface state corresponding to the surface state if a desired shape and surface state such as smoothness, surface roughness, etc., are imparted to the inner surface of the cylindrical mold. As a result, the polishing treatment step of the rubber layer surface in the conventional process becomes unnecessary.

DETAILED DESCRIPTION OF THE INVENTION

Figure 1:
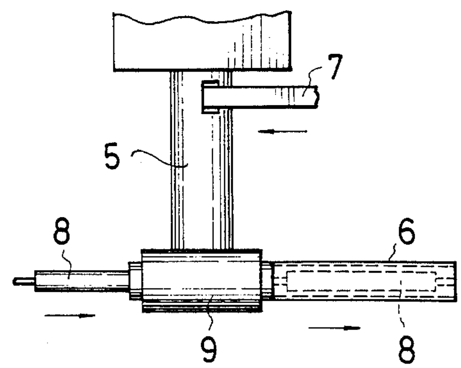
FIG. 1 is a schematic illustration of a cross-head extrusion molding machine for explanation of the process of the present invention.
Figure 2A:
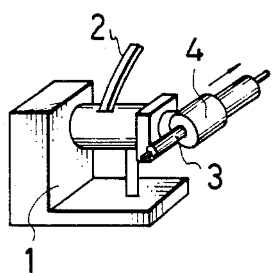
FIGS. 2A and 2B are sectional view and schematic illustration of a cross-extrusion molding machine for explanation of the process of the prior art, respectively.
Figure 2B:
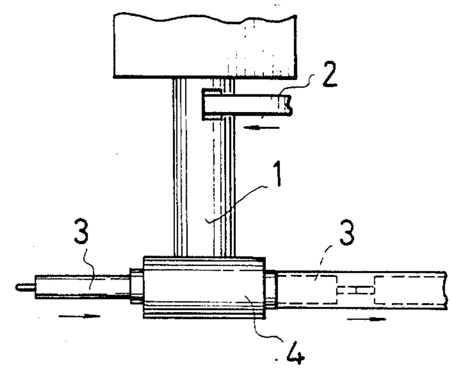

Referring now to the drawings, the main steps of an example of the process of the present invention are described in detail.

FIG. 1 shows the coating step of rubber material onto core metal in the process of the present invention by referring to the case of practicing according to cross-head extrusion molding.

Of course, the coating step of rubber material onto core metal may be also practiced according to other methods than cross-head extrusion molding. Also, in this example, the inserting step into a cylindrical mold is performed continuously after the coating step of rubber material onto core metal, but these need not be performed continuously, if desired.

In the device in FIG. 1, at the outlet 9 of a cross-head extrusion molding machine 5, a cylindrical mold 6 is connected with a chuck equipped with a nail so that the core metal coated with the rubber material delivered to said outlet may be inserted as such into said mold.

That is, when rubber material 7 and core metal 8 are respectively fed through the feeding inlets into this molding machine, these are extruded under the state in which the circumferential wall of the core metal 8 is coated with the rubber material 7 and inserted as such into said mold.

Figure 3:
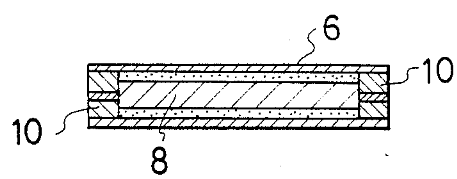
FIG. 3 is a sectional view showing the state in which the metal core within the cylindrical mold is held by pieces.

Depending on the molded product, vibration of the roller may sometimes by a problem, and in such a case, it si perferable to prevent vibration of roller by pressurizing pieces 10 into the shaft portions of the mold 6 and the core metal 8 as shown in FIG. 3.

As the core metal 8, there may be suitably used those formed from aluminum, iron, etc., with a structure, shape and size corresponding to the use of the roller equipped with a rubber layer as the product.

As the rubber material 7, there may be used a material sected to be suitable for use as a roller equipped with a rubber layer such as SBR, NBR, CR, silicone, etc. The amount of the rubber material coated (coated layer thickness) may be such that the rubber material may be sufficiently filled between the core metal and the inner wall of the mold when inserted into the cylindrical mold 6.

On the other hand, as the cylindrical mold 6, there can be used a pipe made of a metal such as aluminum, iron, stainless steel, etc., having a shape of its inner portion corresponding to the roller equipped with a rubber layer, namely the shape capable of imparting a desired shape and thickness to the rubber layer of the roller equipped with a rubber layer after vulcanization, or a pipe made of a metal subjected to, for example, horning working at the inner surface, or a pipe of a metal coated on its inner surface with a resin, and its inner surface is formed so as to have the surface state corresponding to smoothness or surface roughness to be imparted to the final rubber layer surface.

More specifically, by forming a mirror surface on the inner surface of the mold 6 by, for example, coating of a resin such as Teflon, etc., a roller equipped with the rubber layer having a rubber layer surface with the surface state corresponding to its mirror surface can be obtained. While by roughening appropriately the inner surface of the mold 6, a rubber layer surface with a desired surface roughness can be obtained in the roller equipped with a rubber layer.

After the core material is coated with rubber material as described above, the step of vulcanization treatment of rubber material is practiced in the process of the present invention.

This vulcanization treatment can be practiced by taking off the mold in which the core metal coated with the rubber material is inserted from the molding machine and heating this under the conditions corresponding to the material of the rubber material used. After the vulcanization treatment, the roller equipped with a rubber layer is taken out from within the mold 6 as the final product.

The rubber layer of the roller equipped with a rubber layer thus formed has the shape, the layer thickness and the surface state imparted by the mold 6. That is, for example, if the inner surface of the mold 6 is formed with good smoothness, the rubber layer surface of the roller equipped with the rubber layer is formed with good smoothness. Accordingly, no polishing treatment as in the prior art method after vulcanization treatment is required.

The present invention is described more detail by referring to the following Example.

EXAMPLE 1

At the outlet of a cross extrusion molding machine (70 mmϕ) as shown in FIG. 1, a pipe made of iron (length 510 mm) having an inner surface subjected to horning working treatment (surface roughness 10S) with an inner diameter of 36 mmϕ was set.

Next, SBR (styrene-butadiene rubber) is fed from the rubber feeding inlet, and also the core metal made of iron (inner diameter; 16 mmϕ, outer diameter; 22 mmϕ, length; 390 mm, provided by protrusion with columnar shafts of 8 mmϕ in diameter at the centers of both end faces of the tubular portion) is fed from the core metal feeding inlet. The SBR is coated to a thickness of 7 mm onto the surrounding wall of the core metal under the conditions of a screw rotational speed of 30 rpm and a cross-head temperature of 90° C., simultaneously with insertion thereof into the pipe.

Further, the pipe in which the core metal coated with SBR is inserted was treated with direct vapor vulcanization (150° C., 70 min.) by use of a vulcanization can, and cooled to room temperature. The product is then taken out from within the pipe. The rubber layer of the roller equipped with the rubber layer has a layer thickness of 7 mm and its surface state corresponds to the surface within the pipe.

According to the process of the present invention, by a simple operation such as arrangement of a mold for molding the rubber layer at the outlet of the molded product of a cross-head extrusion molding machine, the shape or the surface state of the inner surface of the mold can be easily transferred onto the rubber layer surface after vulcanization treatment. This makes it possible to easily impart the surface state of a desired shape and smoothness or surface roughness, etc., of the inner surface of the mold onto the rubber layer surface. Besides, since the polishing treatment step of the rubber layer surface of the prior art method is not required, such inconvenience as unnecessarily roughening the rubber layer surface by the polishing treatment is unnecessary, and also the number of steps for production can be reduced to realize efficient production steps at a lower cost.

I claim:

1. A process for producing a roller equipped with a rubber layer, comprising the steps of:

coating the circumferential wall of a core metal with a rubber material in a coating apparatus, inserting the core metal coated with the rubber material into a cylindrical mold connected to the coating apparatus, removing the mold containing the core metal coated with the rubber material from the coating apparatus, and then subjecting the mold to a heating treatment.

2. A process for producing a roller equipped with a rubber layer according to claim 1, wherein a piece is mounted at a shaft portion of the core metal.

3. A process for producing a roller equipped with a rubber layer according to claim 1, wherein the core metal is aluminum.

4. A process for producing a roller equipped with a rubber layer according to claim 1, wherein coating of the core metal with the rubber material is performed by cross-head extrusion molding, with a cylindrical mold being connected directly to an outlet of a cross-head, and the core metal coated with the rubber material is inserted into the cylindrical mold simultaneously with delivery thereof from the cross-head.

5. A process for producing a roller equipped with a rubber layer according to claim 4, wherein a piece is mounted at a shaft portion of the core metal.

6. A process for producing a roller equipped with a rubber layer according to claim 4, wherein the roller equipped with the rubber layer is a platen roller.

7. A process for producing a roller equipped with a rubber layer according to claim 1, wherein the roller equipped with a rubber layer is a platen roller.

* * * * *

UNITED STATES PATENT AND TRADEMARK OFFICE
CERTIFICATE OF CORRECTION

PATENT NO. : 4,880,590

DATED : November 14, 1989

INVENTOR(S) : Furuya

It is certified that error appears in the above-identified patent and that said Letters Patent is hereby corrected as shown below:

COLUMN 1

Line 32, "the" (first occurrence) should read --The--.
Line 59, "connected," should read --corrected--.

COLUMN 2

Line 11, "coating" should read --coated--.
Line 68, "by" should read --be--.

COLUMN 3

Line 1, "si" should read --is--.
Line 57, "described" should read --described in--.

COLUMN 4

Line 10, "is inserted was" should read --was inserted is--.

Signed and Sealed this

Eleventh Day of June, 1991

*Attest:*

HARRY F. MANBECK, JR.

*Attesting Officer*

*Commissioner of Patents and Trademarks*